United States Patent [19]

Meyer, Jr.

[11] 3,940,856

[45] Mar. 2, 1976

[54] MICROMETER CALIPERS

[76] Inventor: Franklin Meyer, Jr., P.O. Box 1, Forestdale, R.I. 02824

[22] Filed: Feb. 28, 1974

[21] Appl. No.: 446,712

[52] U.S. Cl. ............ 33/178 R; 33/147 F; 33/174 Q
[51] Int. Cl.² .......................................... G01B 3/34
[58] Field of Search .......... 33/178 R, 147 R, 174 Q, 33/178 D, 147 F, 199 R

[56] References Cited
UNITED STATES PATENTS

| | | | |
|---|---|---|---|
| 1,633,807 | 6/1927 | Darlington | 33/178 R |
| 2,581,955 | 1/1952 | Hunter | 33/178 R |
| 2,741,850 | 4/1956 | Reed | 33/178 R |

FOREIGN PATENTS OR APPLICATIONS

| | | | |
|---|---|---|---|
| 124,001 | 3/1919 | United Kingdom | 33/199 |

Primary Examiner—Richard E. Aegerter
Assistant Examiner—Willis Little
Attorney, Agent, or Firm—Maurice R. Boiteau

[57] ABSTRACT

There is disclosed in the present application a micrometer caliper or gage of the comparator type including an expansible measuring member detachably coupled to an amplifying and indicating mechanism. The mechanism includes an index pointer and a dial which is adjusted to zero relatively to the pointer while the measuring member engages a reference standard. Thereafter, the pointer indicates deviations in measured dimensions of a workpiece on the dial either plus or minus from the size of the standard. The measuring member of the specification is in the form of a partial split ring adapted to measuring the size of external diameters. A sleeve which limits the expansion of the measuring member, however, is equally applicable to calipers for internal dimensions, internal calipers, as is also its interior construction of the measuring member for coupling it to the mechanism.

6 Claims, 4 Drawing Figures

U.S. Patent    March 2, 1976    3,940,856
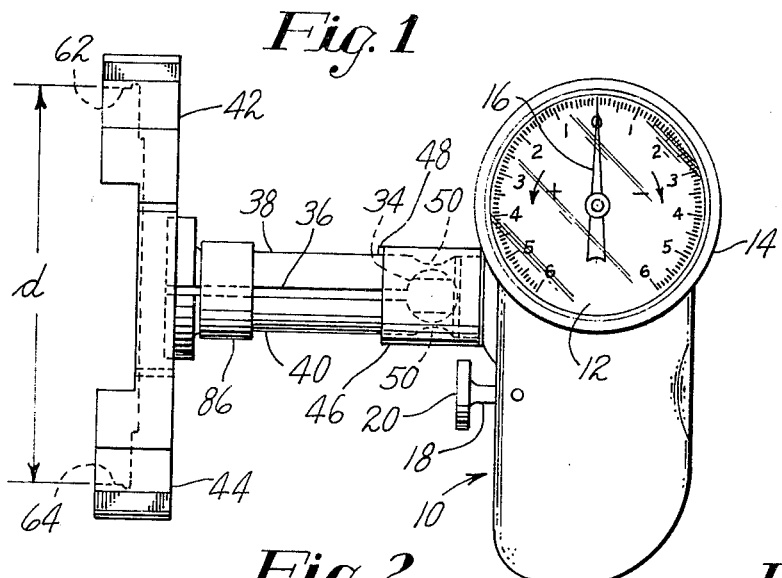
*Fig. 1*
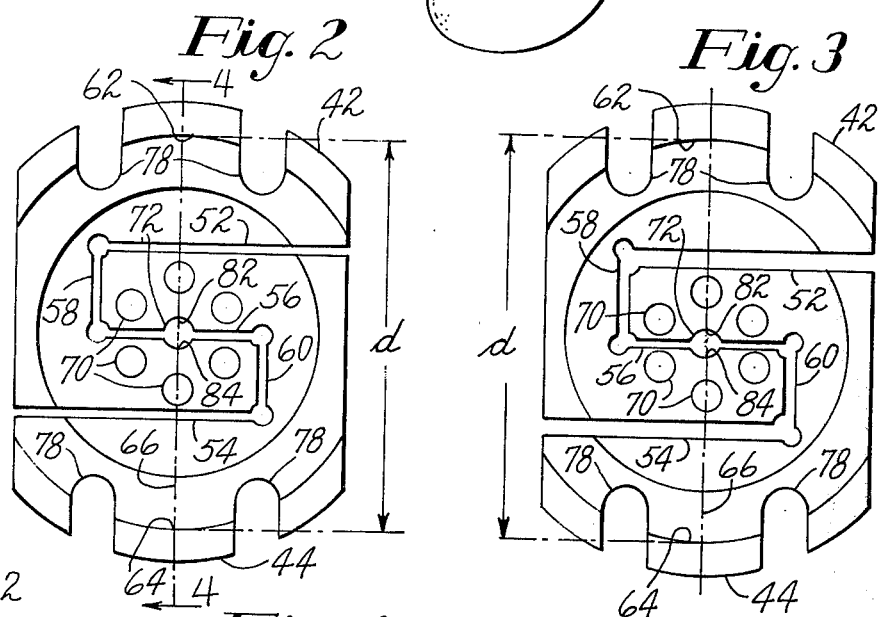
*Fig. 2*    *Fig. 3*
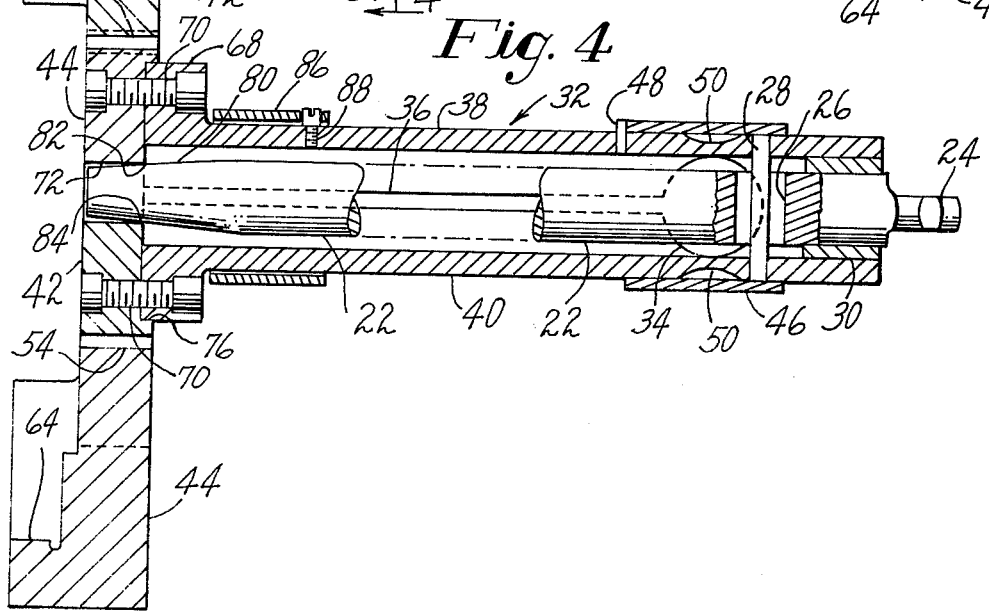
*Fig. 4*

MICROMETER CALIPERS

The present invention relates generally to improvements in micrometer calipers or gages but more specifically to such calipers as that disclosed in U.S. Pat. No. 1,652,854 granted Dec. 13, 1927 upon application of Philip J. Darlington. According to one aspect of the invention, the improvements relate to the provision of measuring or gaging members for external dimensions, external calipers, utilizing a partial split ring member operatively coupled to an amplifying and indicating mechanism. However, the construction of the measuring member is also valuable when applied to internal calipers for measuring internal dimensions.

Internal micrometer calipers according to the above identified Darlington patent have been manufactured and in widespread use since their invention. However, such gages employ an expansible plug as the measuring member and are accordingly useful only for the measurement of internal dimensions. In addition, such internal calipers, which are made in accordance with the disclosure of the patent, are subject to certain disadvantages. One of these is that either accidentally or deliberately the plug of Darlington may be damaged by being expanded beyond the elastic limit of the material. Another is that the same plug is not useful for different amplification factors. Different plugs must be used for measuring two internal dimensions of the same basic size having different tolerance bands. Thus, for example, a first complete plug assembly must be used for a hole having a tolerance band of 0.998 to 1.002 and a second plug assembly for a second hole having the same basic dimension but a tolerance band of 0.994 to 1.006.

It is accordingly an object of the present invention to improve the accuracy in the measurement of external dimensions.

Another object is to increase the speed with which external dimensions are accurately measured.

Still another object is to improve the flexibility of micrometer calipers either internal or external, by providing gaging members which may be employed for measuring a basic dimension even when there is a variation in the tolerance band.

Yet another object is to improve the ruggedness and reliability of micrometer calipers by protecting them against deliberate or accidental damage.

In the achievement of the foregoing objects, a feature of the invention relates to a measuring member especially adapted for being coupled to an amplifying and indicating mechanism such as that disclosed in the Darlington patent. The measuring member is in the shape of a partial split ring detachably coupled to the mechanism and formed in such a way that it is readily expanded to engage the external portion of the workpiece to be measured. The conventional Darlington internal caliper includes a plunger which is coupled to a plug by means of a conical end engaging a conical seat in the plug. In order to contract the plug so that it can be inserted into a hole to be measured, the plunger is retracted causing the plug to collapse on the tapered end thereby allowing it to be easily inserted into the workpiece. The basic construction of Darlington permits only the retraction of the plunger which is spring urged against the seat in the plug to expand the plug and by its axial motion operate the amplifying and indicating mechanism. The present partial ring is so constructed that the same retraction of the plunger causes the ring to expand so that it may be freely placed around the portion of the workpiece to be measured. Thus the shape of the partial split ring is such that its size is made to expand by retraction of the conical-ended plunger which in the internal caliper causes the plug to contract.

According to another feature of the invention, changes in the amplification factor of the caliper assembly whether internal or external are greatly simplified by providing a cylindrical seat rather than a conical seat to cooperate with the conical end of the plunger in coupling the measuring member to the amplifying and indicating mechanism. Accordingly, in order to change the amplification factor within certain limits, the included angle of the cone on the plunger is the only element which needs to be changed, increasing the included angle to reduce the amplification factor and reducing the included angle to increase the amplification factor.

Still another feature relates to a sleeve loosely embracing the limbs of the gaging extensions near their distal end to prevent them from being excessively spread and the caliper thereby damaged.

The foregoing objects, features and numerous advantages of the present invention will be more fully understood from a detailed description of an illustrative embodiment taken in connection with the accompanying drawings in which:

FIG. 1 is a view in side elevation of an external micrometer caliper assembly according to the present invention including a measuring member in the form of a partial split ring;

FIG. 2 is a view in end elevation of the assembly of FIG. 1 showing the split ring with its parts in relative positions which they occupy while being manufactured;

FIG. 3 is a view similar to FIG. 2 but showing in exaggerated relationship the parts of the ring spread apart to measure a workpiece of maximum dimension; and FIG. 4 is a view in longitudinal section and on an enlarged scale of an external micrometer caliper assembly adapted to being detachably coupled to an amplifying and indicating mechanism according to the Darlington patent.

Turning now to the drawings, there is shown an external micrometer caliper according to the present invention and including an amplifying and indicating mechanism indicated generally at 10 which may be exactly the same in its construction and general appearance as that of the Darlington patent. The mechanism 10 includes a dial 12 which is mounted on a bezel 14 to permit it to be rotated for adjustment relative to an index pointer 16 while calibrating the micrometer assembly to a reference master. There is also included in the mechanism 10 a bolt 18 terminating in a thumb piece 20 which is pressed manually to cause the retraction of a plunger 22 seen in FIG. 4, whose function and mode of operation will be described below.

The coupling of the gaging member in the present external micrometer caliper is similar to that in the Darlington internal caliper and comprises a cross head 24 integral with the plunger 22 which is also slotted at 26 to receive a retaining pin 28. The plunger 22 is free for longitudinal motion, being slidable in a bushing 30 which is pressed into a gage body indicated generally at 32 similar in some respects to the plug comprising the gaging member of the Darlington internal caliper. The body 32 is pierced by a transverse opening 34 and slotted at 36 to form a pair of spring limbs 38 and 40 upon the distal end of which is mounted a pair of C-shaped measuring members 42 and 44, seen in FIG. 2 to be substantially like members separated by a generally S-shaped slot. The pin 28 prevents the rotation of the plunger 22 with respect to the body 32 and is retained by a sleeve 46 located longitudinally on the body by a pin 48. The sleeve 46 covers the opening 34 and also a pair of flexible sections 50 which are produced by reducing the wall thickness of the limbs 38 and 40 in the vicinity of the opening 34, the sleeve being sufficiently loose about the body 32 that it does not restrict the necessary deflection of the limbs throughout the operating range of the caliper.

The measuring members 42, 44 may be regarded as originally being substantially completely machined before being separated into two parts by the composite S-shaped slot consisting of horizontal slots 52, 54 and 56, the latter being central, and vertical slots 58 and 60, as seen in FIGS. 2 and 3. The measuring members 42 and 44 are each formed with a contact or gaging surface 62 and 64 respectively ground to a radius slightly greater than the maximum dimension to be measured. For example, in a gage for measuring a dimension d of 4.0025 – 4.0035 the gage members would be ground to a diameter of 4.0060 – 4.0063 which would assure that even while measuring a workpiece having the largest dimension d, contact would be established essentially along two lines lying in the plane of a vertical center line 66 and this condition would of course obtain throughout the useful range of the caliper. The gage members 42, 44 are secured to a flange 68 at the distal end of the legs 38 and 40 by six special screws 70 designed to prevent their loosening or removal. In addition, the gaging members 42 and 44, when taken together are formed with a precise cylindrical central opening or bore 72 counterbored at 76 to receive the flange 68. The gaging members are also formed with sight notches 78 provided so that the diameter to be engaged by the caliper may be seen as the caliper is advanced in an axial direction which would otherwise result in obscuring the target on the workpiece.

The expansion and contraction of the measuring members 42 and 44 is related to the amplifying and indicating mechanism 10 through the longitudinal motion of the plunger 22 which is formed with a conical end 80 engaging points 82 and 84 along the center line 66 at the corner formed by the intersection of the bore 72 with the bottom of the counterbore 76. Since the diameter of the conical end 80 for the interval of its length which co-incides with the plane of the bottom counterbore 76 throughout the operative range of the gage is less than the diameter of the bore 72, contact occurs with each of the gaging members 42 and 44 only at the points 82 and 84 in the plane of the vertical center line 66. When the assembly depicted in FIG. 4 is coupled to the amplifying and indicating mechanism 10 in much the same manner as the internal measuring member of Darlington, a spring contained in the mechanism presses the plunger 22 to the left forcing the points 82 and 84 apart thereby causing the dimension d of the measuring members to be contracted either upon the master for initially calibrating the caliper assembly or upon the workpiece being measured.

The manner in which the spreading effect of the conical end 80 of the plunger 22 reduces the dimension d will be best understood by considering FIG. 3 which shows in an exaggerated manner the relative positions assumed by the measuring members 42 and 44 when the plunger 22 is partially or completely withdrawn out of contact with the measuring members by manually depressing the bolt 18. Under these conditions, the spring limbs 38 and 40 press the points 82 and 84 closer together as the cylindrical bore 72 assumes a generally ovoid condition. As the bore 72 is contracted in a vertical direction as seen in FIG. 3, the measuring surface 64 on the member 44 which is rigidly connected to the point 82 moves downwardly and similarly the surface 62 on the member 42 which is connected to the point 84 moves upwardly thereby increasing the dimension d. In the condition of FIG. 3, the dimension d is greater than the maximum dimension of the workpiece and accordingly the gaging members may be easily slipped axially over the diameter of the workpiece to be measured. Conversely, when the plunger 22 under the urging provided by the spring of the mechanism 10 spreads apart the points 82 and 84, the dimension d is reduced, closing in tightly in measuring engagement with the diameter of the workpiece. The longitudinal motion of the plunger 22 is translated into a motion of the pointer 16 which indicates the difference between the dimension of the part being measured and that of the master to which the dial has been adjusted to zero. The amplifying and indicating mechanism 10 has already been described as generally similar in appearance to that of Darlington, the only difference being that the direction in which increases and decreases of the measured dimension are indicated on the dial 12 are the exact opposite of Darlington. On the dial 12, increases in the dimension d are indicated in a counter-clockwise direction by the plus (+) sign and decreases in the clockwise direction indicated by the minus (−) sign.

It will be readily appreciated that the amount of longitudinal motion of the plunger 22 for a given change in the dimension d is dependent upon the included angle of the conical end 80. Since the conical end 80 bears against the points 82 and 84 and is not matched to a conical socket as in the case of the Darlington gage, the amplification factor may be changed by providing a plunger having a different included angle at the conical end. Thus, the amplification factor is increased if the included angle of the cone is reduced and conversely the amplification factor is reduced if the angle is increased. In this way, the effective amplification may be increased or decreased by a factor of two or three, thereby extending at low cost either the accuracy of measurement or range of the gage as desired.

In order to prevent the limbs 38 and 40 from being either accidentally or deliberately forced apart and thereby impairing the operation of the caliper, a sleeve 86 loosely surrounds the limbs 38 and 40 and is retained by a shoulder screw 88 passing loosely through the sleeve and engaging a threaded opening in the body 32.

Having thus disclosed my invention, what I claim as new and desire to secure by Letters Patent of the United States is:

1. An external micrometer gaging assembly adapted to being detachably coupled to an amplifying and indicating mechanism comprising a longitudinally slotted elongated body formed with a deformable area and a pair of spring limbs, a pair of C-shaped measuring members having interdigitated arms mounted on the distal ends of the limbs, together formed with a socket partly in each of the adjacent arms and each with a measuring surface adapted to engage an external surface on a work piece, a plunger formed with a conical end mounted for longitudinal motion in the body and having the conical end adapted to be spring pressed by the mechanism into the socket to engage and spread apart opposite points on the socket, whereby spreading apart of the points causes contraction of the distance between the measuring surfaces.

2. A gaging assembly according to claim 1 further characterized in that the measuring members are separated by a generally S-shaped slot.

3. A gaging assembly according to claim 1 further characterized in that the socket is a cylindrical bore and the points lie at the intersection of the bore with a flat surface in a reference plane generally normal to the plane of the slot in the body.

4. A gaging assembly according to claim 1 further characterized in that the socket is a cylindrical bore and further comprising a counterbore in the measuring members concentric with the bore, a flange at the distal ends of the limbs fitted to the counterbore, the intersection of the bottom of the counterbore with the bore defining the opposite points in a plane generally normal to the plane of the slot.

5. A gaging assembly according to claim 2 further characterized in that the S-shaped slot defines a pair of substantially equal members, a portion of the S-shaped slot being central and bisecting the socket, the members being so formed that one of the points engaged by the plunger on one side of the central slot is in the same member as a measuring surface on the other side of the central slot.

6. An external micrometer caliper comprising an amplifying and indicating mechanism, including a graduated dial and an index pointer, an elongated, longitudinally slotted body mounted on the mechanism and having a pair of spring limbs, a pair of C-shaped measuring members having interdigitated arms mounted on the distal ends of the limbs, together formed with a cylindrical socket partly in each of the adjacent arms and each formed with a measuring surface, and means for translating the expansion and contraction of the members into an indication by the pointer on the dial, including a plunger coupled to the mechanism and having a conical end pressed into engagement with the socket to cause contraction of the distance between the measuring surfaces.

* * * * *